United States Patent [19]
DeGreve et al.

[11] Patent Number: 5,352,258
[45] Date of Patent: Oct. 4, 1994

[54] PRODUCTION OF GLASS FIBERS FROM SCRAP GLASS FIBERS

[75] Inventors: Stanley C. DeGreve, Allison Park, Pa.; Joe B. Lovelace, Salisbury, N.C.; E. Charles Watkins, Lexington, N.C.; Timothy G. Mathis, Kings Mountain, N.C.; Harry Makitka, Clemmons, N.C.; Thomas C. Bour, Glenshaw, Pa.; John W. Cotton, Lexington; Curtis L. Hanvey, Jr., Boiling Springs, both of N.C.; Dennis S. Postupack, Natrona Heights, Pa.; James V. Shivers, Shelby; Timothy Smith, Lexington, both of N.C.

[73] Assignee: PPG Industries, Inc., Pittsburgh, Pa.

[21] Appl. No.: 40,756

[22] Filed: Mar. 31, 1993

[51] Int. Cl.$^5$ ............................................. C03B 5/16
[52] U.S. Cl. ........................................ 65/474; 65/28; 65/27; 65/134.4; 65/135.9; 65/29.16; 65/490
[58] Field of Search ............... 65/2, 29, 27, 134-136, 65/28, 335

[56] References Cited

U.S. PATENT DOCUMENTS

| | | | |
|---|---|---|---|
| 2,337,072 | 12/1943 | Tarbox . | |
| 2,571,074 | 10/1951 | Tiede et al. | 106/50 |
| 3,476,538 | 11/1969 | Trethewey | 65/29 |
| 3,532,483 | 10/1970 | Cardot | 65/135 |
| 3,912,534 | 10/1975 | Gurta | 134/19 |
| 4,024,647 | 5/1977 | Schaefer | 34/12 |
| 4,054,434 | 10/1977 | Thomas et al. | 65/2 |
| 4,145,202 | 3/1979 | Grodin et al. | 65/2 |

(List continued on next page.)

FOREIGN PATENT DOCUMENTS 1391297 4/1975 United Kingdom .
2112771A 7/1983 United Kingdom .

OTHER PUBLICATIONS

"Glass Science and Technology 6", *The Manufacturing Technology of Continuous Glass Fibres* by K. L. Loewenstein, Elsevier Publishing Company, 2nd Revised Edition, New York (1983), pp. 216–217.

"The Condensed Chemical Dictionary" Tenth Edition, Gessner G. Hawley, Van Nostrand Reinhold Company (1981), p. 480.

Kirk-Othmer "Encyclopedia of Chemical Technology", vol. 4, John Wiley & Sons, Inc. (1964), p. 788.

Kirk-Othmer "Encyclopedia of Chemical Technology", vol. 10, John Wiley & Sons, Inc. (1966), p. 551.

*Primary Examiner*—Robert L. Lindsay
*Attorney, Agent, or Firm*—Kenneth J. Stachel

[57] ABSTRACT

The process and apparatus of the present invention enable the production of glass fiber product from scrap glass fibers. The process includes: feeding the scrap glass fibers having an average length up to around 12 inches to a glass melting tank having a pool of molten fiberizable glass, melting the scrap glass fibers without the presence of non-vitrified glass forming materials in an oxidizing environment, conditioning the melt to a formable viscosity, and forming the glass fiber from the conditioned melt where for a given glass fiber product there is a near constant pull of the melted glass from the melter. The rate of feeding of the scrap glass to the melter is sufficient to maintain the pool of melted glass with a level within the range of ±0.35 inch (9 mm.) over a period of eight hours. The scrap glass fibers have a similar fiberizable inorganic composition to that of the desired glass fiber product and generally include fibers with organic-containing sizes and/or coatings. The apparatus of the present invention has a refractory-lined glass melter, engaged for supply of scrap glass fibers to a positive supply means, a conditioning means to receive formable melted glass, and one or more bushings to form the glass fiber product. The glass melter has a high length to width ratio with a finite-sided melting containment area which holds a pool of molten glass that receives the scrap glass from the feeder without any non-vitrified glass forming material. The feeder supplies the scrap glass at a rate sufficient to maintain the pool of melted glass with a level within the range of ±0.35 inch (9 mm.) over a period of eight hours.

18 Claims, 5 Drawing Sheets

U.S. PATENT DOCUMENTS

| | | | |
|---|---|---|---|
| 4,244,720 | 1/1981 | Boen et al. | 65/2 |
| 4,252,551 | 2/1981 | Nishimura | 65/28 |
| 4,309,204 | 1/1982 | Brooks | 65/28 |
| 4,347,073 | 8/1982 | Aubourg et al. | 65/28 |
| 4,353,725 | 10/1982 | Hohman et al. | 65/27 |
| 4,397,692 | 8/1983 | Ramge et al. | 134/2 |
| 4,422,862 | 12/1983 | Wardlaw | 65/28 |
| 4,432,780 | 2/1984 | Propster et al. | 65/2 |
| 4,462,815 | 7/1984 | Propster et al. | 65/2 |
| 4,580,132 | 4/1986 | Kato et al. | 65/158 |
| 4,592,723 | 6/1986 | Seng | 432/13 |
| 4,663,231 | 5/1987 | Girgis et al. | 428/378 |
| 4,681,802 | 7/1987 | Gaa et al. | 428/392 |
| 4,681,805 | 7/1987 | Puckett | 428/391 |
| 4,752,527 | 6/1988 | Sanzero et al. | 428/391 |
| 4,825,158 | 4/1989 | Watabe et al. | 324/237 |
| 4,853,024 | 8/1989 | Seng | 65/335 |
| 5,063,860 | 11/1991 | Vojtech | 110/256 |
| 5,100,453 | 3/1992 | Richards | 65/27 |

PRODUCTION OF GLASS FIBERS FROM SCRAP GLASS FIBERS

The present invention is directed to a method and apparatus for the production of continuous glass fiber strand products from scrap glass fibers including fibers having coatings with organic compounds and moisture contents.

Glass fiber strand products of the continuous type are produced in various forms. These include textile strands and yarns on bobbins and in fabrics and wound packages of one or more glass fiber strands or bundles referred to as "rovings" and chopped glass fiber strands either from a wet-chop or dry-chop operation for continuous strand. In successfully manufacturing glass fiber products, the powdery batch material for the glass composition of the fibers is carefully controlled to favor successful formation of continuous lengths of glass fibers and to favor formation of complete packages of wound strands with minimal occurrence of defects such as stones, bubbles and cords. The fibers are formed by passing the melted and refined batch through a bushing or spinneret usually located as one of a plurality of bushing or spinneret positions in a forehearth of a glass melting tank. The bushing and spinneret have a plurality of orifices from which molten streams of glass are attenuated and cooled rapidly to form the glass fibers. In the production of continuous fibers or filaments from a bushing, the attenuation or pulling force can be provided by a winding machine.

In the production of glass fibers, the fibers can be treated with different types of chemical treatments at various points in the production process. For instance, shortly after the continuous fibers are drawn and cooled, they usually receive a chemical coating. This coating that can have organic compounds can provide at a minimum adequate protection from interfilament abrasion in any subsequently gathered bundles of fibers, especially in further processing operations. The coating usually is applied as a size from an aqueous solution, emulsion or suspension or from a foam. In the fabrication of the various glass fiber strand products, other chemical treatments that can be used include mat binders for continuous and chopped strand mat products and coatings for strands or bundles of fibers to produce coated products.

The manufacture of these various glass fiber products can generate some waste or scrap glass fibers in the forming process itself and during fabrication and further processing of the glass fibers into saleable products. Scrap can result for a number of reasons such as filament breakage, incomplete payout of packages, and the like. With the production of scrap glass fibers, the art has devised procedures for remelting the scrap, mindful of the required careful control of the batch materials, to produce the melt leading to the formation of glass fibers.

The art admonishes that the recycle of the scrap glass needs careful control itself or the activity is fraught with serious complications. For instance, the presence of the organic material on the waste glass fiber can present complications adversely affecting the corrosion rate of the tank, and/or changing the redox state of the glass. The latter can adversely affect the radiant heat transfer characteristics of the glass. Two adverse results of these complications can be the production of foam in the melter and of a darker colored glass which is brownish in color and commonly called "carbon amber". Also, the different melting characteristics of the scrap glass and the batch glass forming constituents can result in problems if the amount of scrap glass fibers exceeds more than around 20 weight percent of the raw materials fed to the melter. A few of these problems are non-uniform viscosity and variations in the melting rate. The scrap glass has a different density from that of any melted glass in the melter so that it tends to float on the surface of the melter. The result can be the formation of a static mass over the top of the melt producing a slower heat transfer through the mass and a reduction in the melting rate. This can lead to the formation of a fused mass since the scrap in the floating mass can fuse on its lower surface next to the melt.

The art further admonishes that these difficulties are compounded by the different melting rates of the batch constituents added to the melter compared to that of the scrap glass fibers. The remelting of the glass fibers occurs relatively rapidly since it is already in vitrified form, and the slower melting of the batch constituents through a vitrification reaction can be obstructed by the remelted glass. This can result in the presence of unmelted raw materials of batch constituents in the molten glass. This, like any remaining carbon trapped in the fused mass, can generate defects or inhomogeneities which can ultimately disrupt the fiber forming process. Also, the batch constituents can form or be incorporated into the static mass formed from the scrap glass to form a mass with a doughy consistency to prevent complete oxidation of the organic materials in the scrap glass fiber and/or to retard the melting process.

The art has attempted to overcome these problems by various routes. These include careful control of the recycled scrap and batch constituents added to the melter, elaborate procedures for removing organic materials from the scrap prior to introduction to the melter, or elaborate circulation arrangements of scrap having organics that are added to a specially designed melter.

It is the object of the present invention to provide a facile process and apparatus for producing glass fiber strand products from scrap glass fibers including those with organic coatings without experiencing one or more of the aforementioned difficulties.

SUMMARY OF THE INVENTION

The aforementioned object and other objects gleaned from the following disclosure are provided by the present invention as a solution to one or more of the aforementioned problems.

In the broadest aspect of the process of the present invention, glass fiber strand products are made from scrap glass fiber strand involving the steps of: feeding the scrap glass fibers having an average length up to around 12 inches and having a similar fiberizable inorganic composition to that of the desired glass fiber product to a glass melting tank having a pool of molten fiberizable glass, melting the scrap glass fibers without the presence of non-vitrified glass forming materials in an oxidizing atmosphere or environment, conditioning the melt to a formable viscosity, and forming the glass fiber from the conditioned melt where for a given glass fiber product there is a near consistent pull of the melted glass from the melter. The rate of feeding of the scrap glass is sufficient to maintain the pool of melted glass with a level within the range of ±0.35 inch (9 mm.) over a period of eight hours. The glass melting tank has the oxidizing environment in at least the portion of the tank to which the scrap glass fibers are fed. The initial pool of molten glass can be formed from melting already vitrified and/or non-vitrified glass forming materials. Generally, the scrap glass fibers include those with organic-containing sizes and/or coatings.

The process can include one or more additional steps of: preparing the scrap glass into certain lengths, drying the scrap glass, detecting contaminants in the scrap glass and removing them, and producing cullet in addition to glass fiber product from one or more bushings.

The broadest aspect of the apparatus of the present invention is an apparatus for melting scrap glass fibers without the presence of non-vitrified glass forming materials to form glass fiber products from one or more bushing positions. The apparatus has a refractory-lined glass melter generally with a high length to width ratio with two pairs of opposing sidewalls connected with a floor and supporting a crown as the roof to form a finite-sided containment area for melting within the melter. The melter has one or more scrap glass supply openings located around one end, and a plurality of spaced apart hydrocarbon fueled burners. The burners are capable of providing an oxidizing environment at least in a portion of the melter around the one or more supply openings. Around the end opposite the end with the supply opening, there is a melt flow connection to a forehearth where the connection enables the formation of a pool of molten glass in the melter. The pool can have a depth that is sufficient to permit gravity flow of the melted glass to the forehearth, but that is shallow enough to facilitate effective heat transfer throughout the depth of the pool. The forehearth has at least one bushing position at a glass conditioning distance from the melter for the formation of the glass fiber product. A positive feeding means is in supply engagement with the melter capable of a feed or supply rate of scrap glass fibers that is sufficient to maintain the pool with a level that varies less than around ±0.35 inch (9 mm.) over an eight-hour period. This level control is when for a given type of glass fiber product there is a near consistent pull of molten glass from the melter.

Also, the apparatus can have such additional elements as: a closing means associated with the positive feeder, a gas-type forcing convection means for the melter, and one or more bushing positions for producing cullet. Also with the positive feeder, there can be associated one or more of the following: a metering means for a more steady supply of the scrap glass fibers, shredding means for the scrap glass fibers, drying means for the scrap glass fibers, and non-glass solid detection and removal means.

BRIEF DESCRIPTION OF THE DRAWINGS

FIG. 4b is a vertical longitudinal section giving a side view of the apparatus of FIG. 4a.

DETAILED DESCRIPTION OF THE INVENTION

Figure 1:
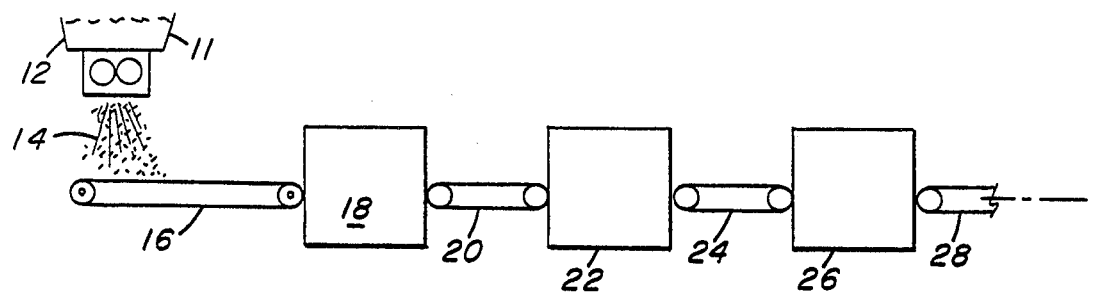
FIG. 1 is a schematic of the process of the present invention including shredding the scrap glass fiber to the production of glass fiber product.
Figure 1:
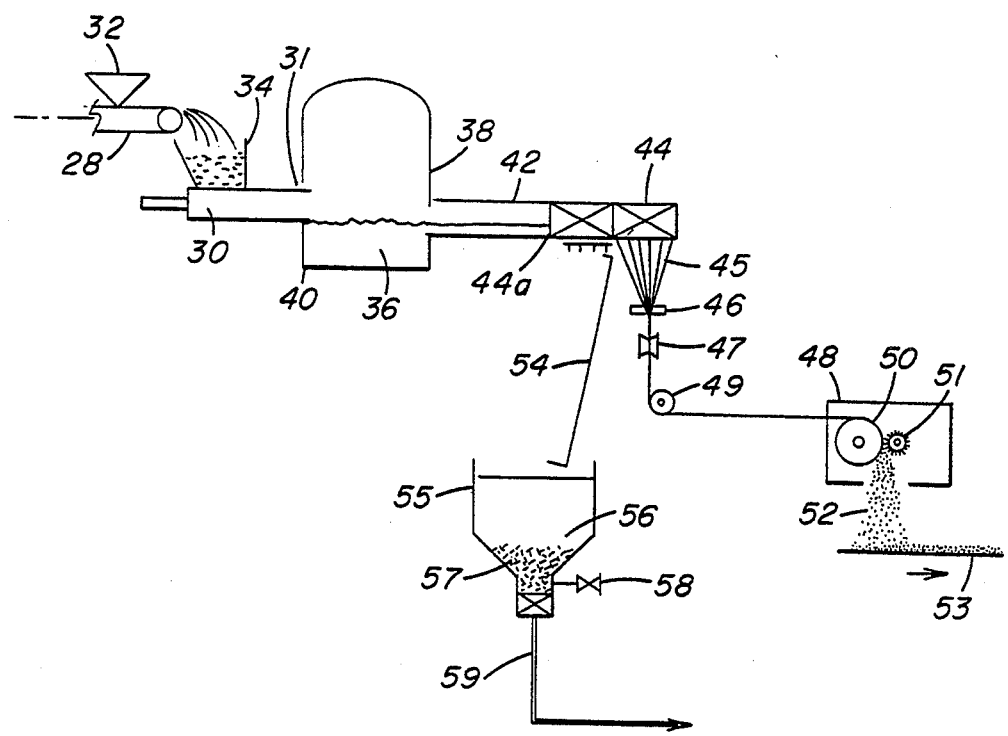

The process of producing a glass fiber continuous strand type product from scrap glass is depicted in FIG. 1. The scrap glass fibers (hereinafter referred to as "scrap") is prepared into lengths averaging up to 12 inches (305 mm.). Generally, all of the scrap has fiber lengths less than 100 inches (2,540 mm.). Any method known to those skilled in the art for preparing the scrap in this manner may be used. One particularly useful preparatory step is shredding the scrap. Scrap length preparing means 11 can be any conventional shredder knows to have the capability of shredding glass articles, such as mats, ropes, strand, and fibers, to lengths ranging up to continuous fiber strand wound on packages weighing upwards of 100 pounds (45.4 kg.). Preferably, the shredder will be able to produce the shredded Scrap 14 in amounts up to around 12,000 pounds per hour. A suitable nonexclusive example of a shredder is that available from Shredding Systems, Inc. of Wilsonville, Ore. as SSI Model 3400H with direct hydraulic drive. Scrap 12 is supplied to preparer 11 by any conventional means such as conveyor belts, dumping of bulk containers and the like.

The Scrap 12 itself has a composition approximately similar to that desired in the glass fiber product from the process. For instance, if the glass fiber product is desired to have an E-glass composition, the Scrap 12 is comprised of at least a predominant amount and preferably all of E-glass. The composition of E-glass is well known to those skilled in the art, as described in U.S. Pat. No. 2,334,961, and can comprise 52 to 56 $SiO_2$, 16 to 22 CaO, up to 6 MgO, 12 to 16 $Al_2O_3$ and 5 to 12 percent $B_2O_3$. Likewise, if the glass fiber product that is desired is a "621" type glass, the Scrap 12 has a predominant amount of and preferably all 621-glass. This is another glass composition well known to those skilled in the glass fiber industry and is described in U.S. Pat. No. 2,571,074. Likewise, with A-glass, C-glass, D-glass and S-glass compositions, the scrap entering the process should be at least a predominant amount and preferably all of this glass composition that is desired in the glass fiber product. Where a low boron and/or fluorine glass is desired as the glass fiber product, small amounts of higher boron and fluorine containing glasses can be used in the Scrap 12 as a mixture since the glass product usually has a lower amount of these two components than the amount of materials supplied to the melter.

As used herein the term "glass forming material" or "glass former" refers to glass forming oxides that form a vitreous state with silica. The term "non-vitrified glass forming materials" refers to batch-type oxide constituents that form glasses when melted and cooled to avoid crystallization. These materials would not have a previous melt history. Nonexclusive examples of "glass forming material" with a previous melt history that can be added to the melter with the Scrap 12 is cullet, frit, glass marbles, glass beads and the like. In the context of this application, the term "cullet" means glass in a form other than fiber and Scrap 12 that is prepared for remelting in the melter to produce fibers. It would be similar to and can include glass marbles except it would also include glass in other shapes like broken glass and rods. The term "frit" refers to finely powdered glass; for example, like that produced by melting and quenching in water or between water-cooled rollers and the frit can contain fluxes and coloring agents.

Also, the Scrap 12 can range in length from milled fibers to continuous lengths of fibers and strands and even wound packages of continuous glass fiber strand and trimmings of continuous and chopped glass fiber strand mat products and the mats themselves and the like. The glass fibers can have an organic-containing coating on their surfaces, usually referred to as a sizing or binder or can be free of such sizings in the case of glass produced from drain bushings. The filament diameters of the fibers can be any of the known filament diameters for glass fibers ranging from the smallest around 1 to 5 microns to bendable rods from drain bushings. This includes even to a substantial amount down-chute glass fiber forming waste, which consists predominantly of very thick fibers and glass beads. Typically, when the Scrap 12 has sizings, the amount of the sizing ranges from a fraction of 1 percent by weight, as measured by Loss on Ignition (LOI), upwards to around 3 weight percent for sized products. Coated glass fiber strand products having a secondary coating in addition to the size can have even higher amounts of organic-containing coatings even up to as high as 15 and in some cases as high as 20 weight percent. Nonexclusive examples of the organic-containing coatings, such as sizes, and secondary coatings that may be present on the fibers or strands in the Scrap 12 are those of the following U.S. Pat. Nos.: 4,465,500; 4,470,252; 4,476,191; 4,477,496; 4,477,524; 4,483,784; 4,483,948; 4,518,653; 4,530,876; 4,532,169; 4,536,446; 4,536,447; 4,542,065; 4,542,106; 4,582,873; 4,592,956; 4,615,946; 4,626,289; 4,637,956; 4,663,231; 4,681,658; 4,681,802; 4,681,805; 4,728,573; 4,745,028; 4,748,121; 4,752,527; 4,762,750; 4,762,751; 4,771,019; 4,775,400; 4,778,499; 4,784,918; 4,789,593; 4,806,620; 4,808,478; 4,810,576; 4,842,620; and 4,853,001. Additionally, any other sized glass fiber strand or coated glass fiber strand products known to those skilled in the art can constitute part of the Scrap 12 as long as the glass composition of the glass is similar to that desired in the glass fiber strand product from the process.

Figure 3:
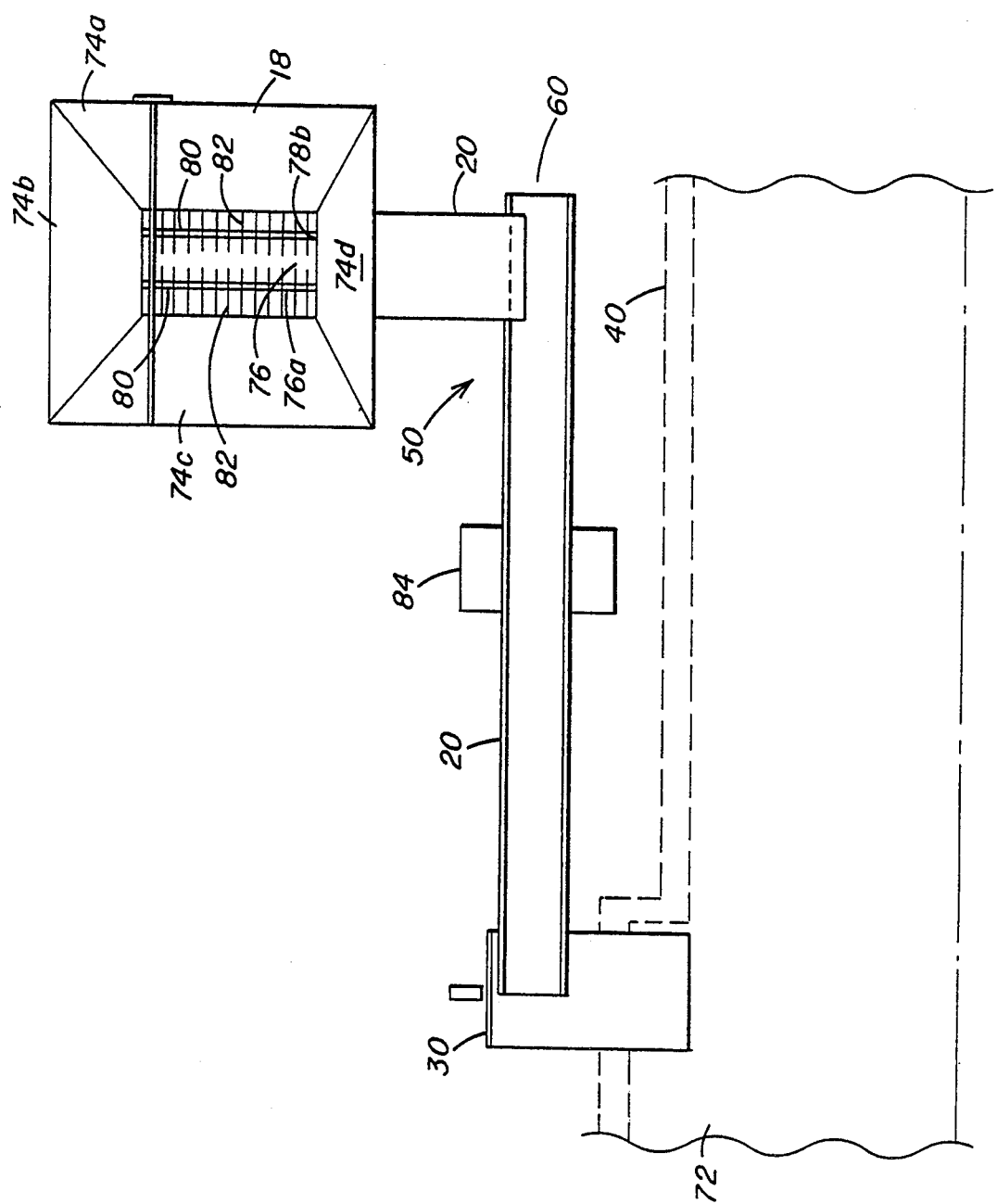
FIG. 3 is a plan view of the material supply apparatus including the positive feeding means.

The prepared Scrap 14 can be conveyed by conveyor 16 to a first zone 18 that can be a metering device or means. The conveyor for the prepared scrap can be any means known to those skilled in the art for transporting prepared Scrap 14 like shredded glass fibers from one location to another. A nonexclusive example of such a transportation means would be a conveyor belt or small or large bulk containers or a bucket conveyor and the like. The metering device as in zone 18 can be any conventional apparatus known to those skilled in the art for providing a steady supply of fiberous material. Preferably, the steady supply is in an essentially unclumped mass. A suitable nonexclusive example of a metering device would be a picker apparatus as shown in FIG. 3.

The Scrap 12 from zone 18 can be conveyed by a conveying means 20 to a second zone 22 like a drying means. Conveying means 20, of course, can differ from conveying means 16 in that once the Scrap 12 or 14 is metered, the conveying means is a conventional conveying means to maintain the metered material. Zone 22 as a drying means can be any conventional drier known to those skilled in the art to reduce the amount of moisture in scrap to less than around 10 weight percent of the scrap fed to the drier and preferably around less than 5 weight percent and most preferably around less than 2 weight percent of the scrap fiber. Nonexclusive examples of a suitable drier include infrared heaters, such as those employed in U.S. Pat. No. 4,024,647.

The Scrap 12 or 14 from zone 22 as at least partially dried and prepared scrap can be conveyed by conveyor 24, which can be similar to conveyor 20, to zone 26 which can act as a contaminant detector. Zone 26 is necessary in situations where the collection of scrap might include metallic materials and other non-glass materials customarily used in glass fiber strand manufacturing facilities so that these materials can be removed from the scrap that is fed to the melter. Any contaminant detector known to those skilled in the art, such as a metal detector, can be used in or as zone 26. A nonexclusive example of such a detector is an Eriez metal detector E-Z Tec/III model available from Eriez Manufacturing Company, Erie, Pa., which uses an inductor of fixed inductance and a capacitor of fixed capacitance to generate a field of fixed frequency. With metal contaminants passing the detector, the spatial location and amplitude of the field are affected.

The Scrap 12 is conveyed from the contaminant detecting zone 26 via conveyor 28 to the feeding means 30 for melter 40. Conveyor means 28 can be arranged or fitted with a diverter means 32 for removal of any detected contaminants from the scrap. For instance, diverter means 32 can be any slot in the conveyor, like conveyor 28, which opens to remove the contaminant. Also, means 32 can be any general removal means for pushing the contaminant off of the conveyor so that the contaminant does not reach positive feeding means 30. Also, the diverter means 32 can be in the zone, like zone 26, that acts as the contaminant detecting zone so that after the contaminant is detected it is removed. In this case zone 26 acts as a detecting and removal zone.

The presence of the metering means 18, the drier 22 and the contaminant detector means 26 can be varied so that none or any one or combination of two or more can be used. Also, their arrangement can be varied to be in any sequence depending upon the particular method employed to carry out the operation. For instance, if drying means 22 is an air-drying means for use over longer periods of time, the scrap can be dried prior to metering. In this case, the drier would be 18 and the metering means would be 22 so that it is dried scrap that is metered. Also, the sequence of the drier 22 and the contaminant detecting zone 26 can be varied once the metering means is established as the first operation after scrap preparation. In this alternative, the contaminant detecting zone can precede the drier although it is much easier to detect contaminants after a metering operation. Therefore, with zone 18 as the metering operation, zone 22 could be the contaminant detecting zone and zone 26 could be the drying zone. Also, the conveyors 16, 20, 24 and 28, depending on the space constraints around melter 40, can be parts of one continuous conveyor or can actually be distinct separate conveyors operating in the same arrangement and plane as the prior conveyor or at different arrangements, such as right angles to each other, and possibly at different planes depending upon the elevations of zones 18, 22 and 26.

The positive feeding or supply means can be any feeder known to those skilled in the art for conveying fiberous material of varying lengths up to 100 inches (2,540 mm.) into an area of elevated temperature. For instance, feeder 30 can be an auger which is rotated to take the Scrap 12 or 14 from one end of the feeder to the other that is located in the vicinity of melter 40. Also, the supply means 30 can be a stream of air through an elongated chamber such as that described in published British patent specification 1,391,297. Preferably, the supply means 30 has a hopper means 34 which assists in regulating the rate of feed to melter 40 by supplying a near uniform or steady feed and also providing surge capacity. Preferably, the supply means 30 is an auger with a more dynamic design as discussed infra for FIG. 5. Also, the supply device 30 is preferably movable so that it can be connected to melter 40. Also, the supply means 30 has the capability to supply the scrap at a rate, alone or with other already vitrified glass forming materials, that can maintain a level of the pool of melted glass in the melter 40 at a ±0.35 inch and preferably ±0.25 inch or less. The maintenance of this level is while the melted glass is pulled from the tank for forming the glass product at a nearly constant rate for a given type of glass fiber product. The nearly constant rate refers to a pull from the melter to produce a glass fiber product having a specific filament diameter within acceptable tolerances known in the art when a bushing is used with a same or similar tip size and the rate of attenuation from the winder is approximately the same.

Before molten glass is pulled from melter 40 to produce glass fibers, a sufficient pool of molten glass is accumulated. The pool 36 can be formed from scrap, non-vitrified glass forming material, and/or vitrified glass forming material and mixtures thereof. Preferably, the pool 36 is formed from non-vitrified glass forming material before Scrap 12 is supplied to melter 40. When batch is used to prepare pool 36, the supply means 30 is movable and actually is preceded by batch feeders that supply the batch to the melter 40 for the initial charge to form pool 36. Although supply means 30 need not be moved if it is a type of feeder that handles scrap and can also handle batch and/or cullet to establish the pool of glass melt 36 in melter 40. Preferably, one or more scrap glass supply openings 31 are located around one longitudinal end of melter 40 for supply connection with supply means 30. The accumulation of pool 36 can be by any method known to those skilled in the art; for instance, the melter is constructed for such accumulation by a weir or flow channel arranged for this purpose.

Generally, the other necessary features of the melter 40 are that it is refractory-lined and is operated to have an oxidizing atmosphere for glass melting at least where the Scrap 12 or 14 is added. This would be at the end around supply means 30 in FIG. 4. Also, the melter 40 must have melting means to provide an effective temperature to melt the glass which for an E-type glass or 621-type glass is generally in the range of around 1220° C. to around 1290° C. (2228° F. to 2354° F.) under glass temperature. Such a melting means is a plurality of hydrocarbon fueled burners 38. The oxidizing atmosphere is produced by supplying the hydrocarbon burners 38 with an excess amount of air or oxygen over and above that needed to combust the hydrocarbon fuel supplied to the burners. Preferably, the oxidizing atmosphere is formed from at least 1 to around 3 percent excess air or oxygen supplied to at least one of the burners near the feed end of melter 40. Preferably, the burners 38 are arranged as a plurality of spaced apart opposing pairs along the two opposing longitudinal sidewalls so one burner generally opposes the other. Also, the burners 38 preferably are capable of providing another condition within the melter 40 establishing and maintaining a temperature profile to yield a hot spot in pool 36. With this hot spot, natural convection currents in the melted glass provide a substantial amount of the mixing of the melt so that mechanical mixing devices are not necessary to provide good glass homogeneity. The hydrocarbon fuel burner 38 and the refractories for the melter 40 can be any standard conventional air hydrocarbon fuel or oxyfuel burners and refractories, respectively, known to those skilled in the art. Preferably, the melter has high length to width ratio and most preferably the ratio is around 3 to around 1. Preferably, melter 40 has a containment area for melting of around 10 to around 215 square feet (1 to 20 square meters).

At least one forehearth 42 is in melt flow engagement with melter 40 through a conventional melt flow connection like a channel and skimmer block arrangement or a throat. Preferably, the forehearth 42 is located downstream of the wall of the melter longitudinally opposite the wall closest to the supply means 30. The temperatures in the forehearth are generally less than the temperatures of the melter to condition the glass melt to a forming viscosity for the forming of fibers, rods, marbles and the like. The forehearth 42 can have one or more bushing positions 44 to produce the product of strands of glass fibers. The forehearth and bushing constructions can be conventional as known to those skilled in the art. The forehearth is typically refractory-lined and its operation as well as the construction and operation of the one or more bushings are all conventional as known to those skilled in the art. Non-exclusive examples of these are disclosed in the book entitled "The Manufacturing Technology of Continuous Glass Fibers" by K. L. Loewenstein, Elsevier Publishing Company, New York, N.Y. (1983). Preferably, at least one bushing position 44 can be operated to produce wet-chopped glass fiber strands 52, although other types of glass fiber products also can be produced. In any event the fibers are pulled by any pull roll of any winder or chopping apparatus 48 known to those skilled in the art like a wet-chop pull roll or a forming winder or a roving winder. The pull rate of the pull roll of apparatus 48 is sufficient to produce the desired glass fiber product while the rate of feed from supply means 30 to the melter 40 can be from the supply of Scrap 12, alone or with other vitrified glass forming material but free of unvitrified glass forming material. The supply rate maintains the level of pool 36 with the nearly constant pull rate for a given glass fiber product from the winder. Preferably, the Scrap 12 is supplied at a rate to constitute 100 percent of the glass forming material supplied to the melter 40 for a substantial portion of the production of a given glass fiber product 45. When amounts of scrap less than 100 percent are supplied, the other vitrified glass forming materials are added to the melter 40 by the appropriate percentage to make up the 100 percent. These other vitrified materials can be supplied through the same supply means 30 or to another feeding means located around the same location in melter 40 as feeding means 30.

In producing wet-chop glass fiber product 52 of FIG. 1, the continuous fibers 45 from bushing 44 can be treated with a sizing composition at applicator 46. The fibers are gathered at gathering device 46 and directed by contact device 49 to the chopper 48 with pull roll 50. The gathered bundle or bundles of fibers or strand or strands are chopped by cutter roll 51 to chopped strand 52. The chopped strand 52 is collected on collecting device 53. Any equipment and processes known to those skilled in the art for producing wet chopped glass fiber product or any other product can be used.

Alternatively, the forehearth 42 can have one or more other types of bushing positions 44A having drain bushings to produce cullet or frit, preferably by fluid quenching with water. The material from the drain bushing can travel down chute 54 to a container 55 having water 56 as a fluid supply means. Upon contacting the water, the rod or stream of molten or near molten or hot glass fractures to produce cullet 57, which settles to the bottom of container 55. The cullet 57 is separated from the water 56 by drain 58 as a separation means that can first remove the water 56 and remove the cullet 57 to storage by removal conduit 59. Any generally conically-shaped collecting vessel and drain or other water separation device known to those skilled in the art can be used in the present invention.

FIGS. 2–5 show the preferred steps and elements of the present invention where elements similar to those shown in FIG. 1 are referenced with the same numerals as for those elements in FIG. 1.

Figure 2:
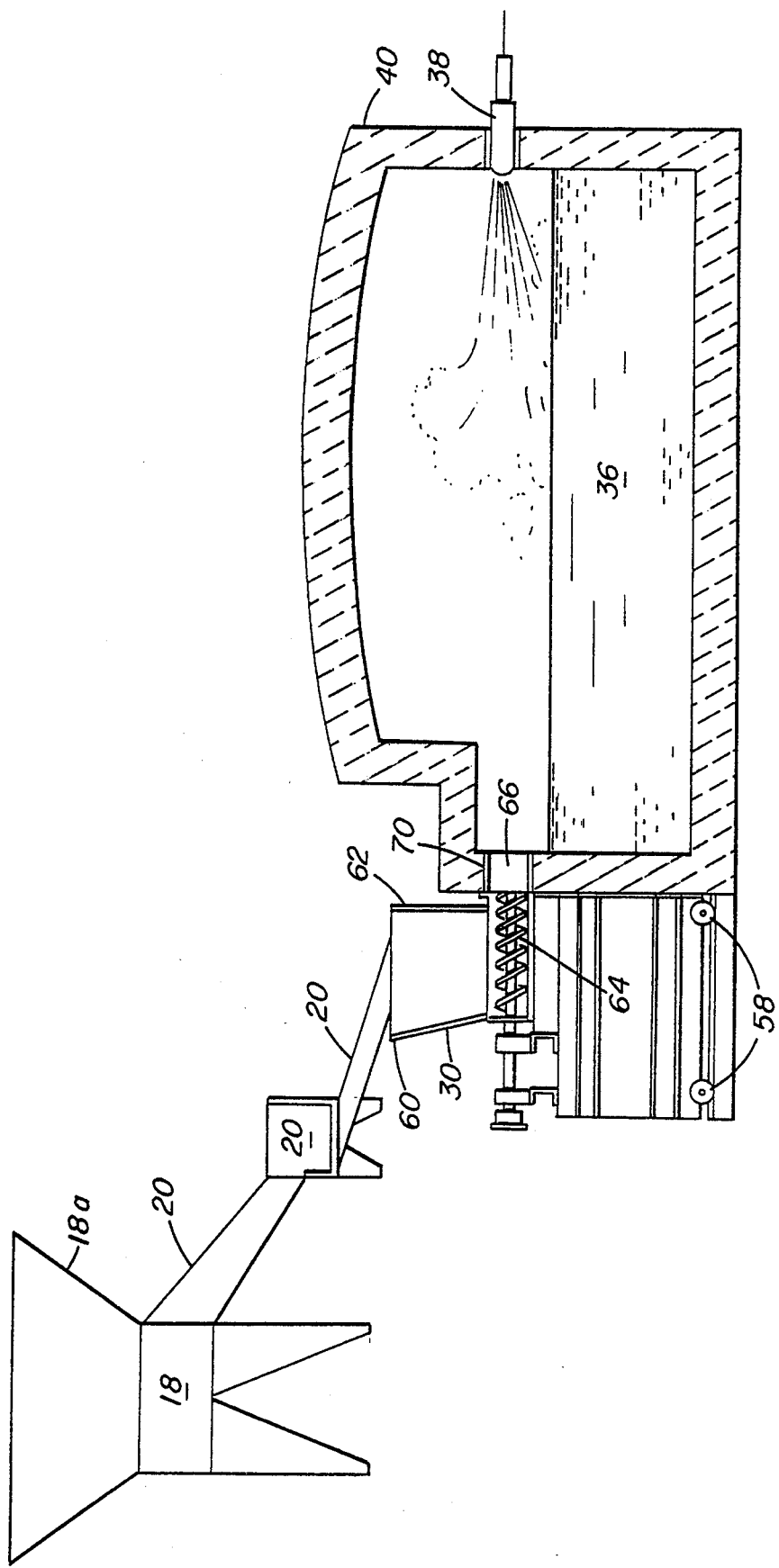
FIG. 2 is a vertical transverse section through the glass melter at the feeding end of the melter, also showing the material supply apparatus with the positive feeding means for delivery of material to the melter.

FIG. 2 shows the material supply apparatus 60 which is made up of metering means 18 with hopper 18a, conveyor 20 and supply means or feeder 30. The feeder 30 is associated for material supply into melter 40 through opening 70 which can be the port 31 of FIG. 1. Additionally, FIG. 2 shows one of the plurality of burners 38. The metering means 18 is preferably a rotary picker as shown in FIG. 3. The conveyor 20 delivers the metered Scrap 12, which is preferably already prepared by shredding Scrap 14, to a hopper 62 of feeder 30. The lopper acts to supply some surge capacity to the material supply apparatus. The feeder 30 is preferably a dynamic or positive supply means like auger 64. The feeder 30 is also associated with a closing means. This closing means can be any conventional closure for material handling, but the closing means is preferably dead space 66 that is available for filling by the Scrap 14. Dead space 66 is located at the distal end of the auger 64 from the feed end of auger 64. As Scrap 14 or other feed are conveyed by the auger 64, a build-up of the material occurs in the dead space 66. The build-up moves into the melter 40 as in a plug-flow movement thereby acting as the closing means. In addition or alternatively, hopper 62 can have a closing means that is a suitable lid the hopper 62. The closing means is preferred to reduce the amount of heat escaping from melter 40. Preferably, the supply means 30 is movable by moving means 68. Moving means 68 can be any suitable track, wheels, rollers or the like for engagement and/or disengagement of the feeder 30 from melter 40. The movement of feeder 30 may be required if feeder 30 is not of a sufficient design to convey batch material and/or cullet, when either or both materials are employed to form pool 36. In either of these cases, a batch or cullet feeding means would be moved into the position of opening 70 for conveyance of the batch and/or cullet and/or frit (generally vitrified glass forming materials) to melter 40. Alternatively, the melter 40 can have more than one opening 70 where one opening is occupied by feeder 30 for feeding of the Scrap 14 and the other opening is occupied by a batch and/or vitrified material feeder.

FIG. 3 shows a preferred material supply apparatus 60 associated with melter 40 shown in phantom. Metering means 18 has a finite-sided hopper 18a with the sides 74a–d connecting to each other in a funnel-like manner to form a circumference or perimeter around an opening 76 with two picker units 78 rotatably connected across the opening 76. Each picker unit 78a–b has a rotatable rod-like longitudinal member 80 in close coplanar essentially parallel arrangement to each other across opening 76. Each member 80a–b has a plurality of tines 82 projecting radially outward and any deviation from the coplanar and parallel arrangement still allows for the close proximity of one picker unit 78 to the other. This closeness allows the tines 82 of one rotating rod to approach the tines 82 of the other rotating rod but these approaching tines are either slightly spaced apart without the ends touching or interlaced so they pass between each other. These pickers 78 can rotate in a direction toward the space in between them. Also, the pickers can be rotated in reverse for alternating the flow of Scrap 12 or for cleaning of the tines. The Scrap 12, which is preferably shredded, can be added to the metering means 18 by any method known to those skilled in the art for adding bulk material to a hopper such as conveyor belts or the dumping of bulk containers. The rotating pickers 78 move the Scrap 14 onto conveyor 20 for movement of the scrap to supply means 30, which is in supply engagement with melter 40.

The conveyor 20 can have one or more treatment zones 84 for drying and/or contaminant inspection for and removal of (I&R) solid non-glass materials, as aforedescribed for FIG. 1. The drying and contaminant I&R zones can be as in FIG. 1 in either order, although it is preferred to have both present and the drying zone before the contaminant I&R zone.

Figure 4A:
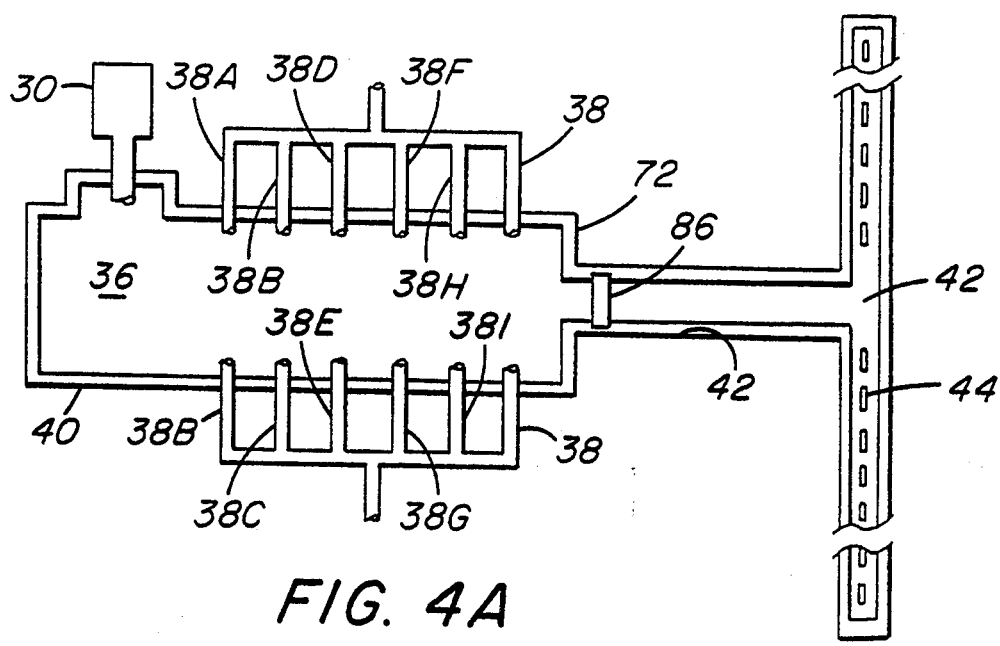
FIG. 4a is a plan view of the feeding means of the material supply apparatus with the positive feeding means and the melter with hydrocarbon fuel supply, the forehearth and the glass fiber production bushings.

FIG. 4a shows in more detail the arrangement of the plurality of burners 38 for providing an oxidizing atmosphere to at least the portion of melter 40 closest to feeder 30. This is performed by having the hydrocarbon fuel burner 38a and/or 38b provided with an excess of air or oxygen, preferably air, over that needed for stoichiometric combustion of the hydrocarbon fuel supplied to that burner. Preferably for ease of operation, all of the burners 38a through 38i can be operated with up to the same excess of air or oxygen. Alternatively, one or more of the burners can be oxyfuel burners known to those skilled in the art. Around the longitudinal end 72 of melter 40, forehearth 42 is in melt flow engagement with melter 40. Preferably, this engagement allows for pool 36 by its depth to assist in the gravity flow of the melt to the forehearth where a substantial component of the flow is horizontal. Also the depth can be sufficient to yield a surface to volume ratio of the melt to reduce any refractory contamination of the glass melt leaving the melter. Preferably, the depth of pool 36 in melter 40 is around 23 to around 25 inches (584 to 635 mm.). A skimmer block 86 can be used to control the flow of surface melted glass from the melter to the forehearth 42. The forehearth 42 can have a T-shaped design, as shown, or any other forehearth configuration known to those skilled in the art and the bushing positions generally indicated by 44 are shown on the bottom or floor of forehearth 42.

Figure 4B:
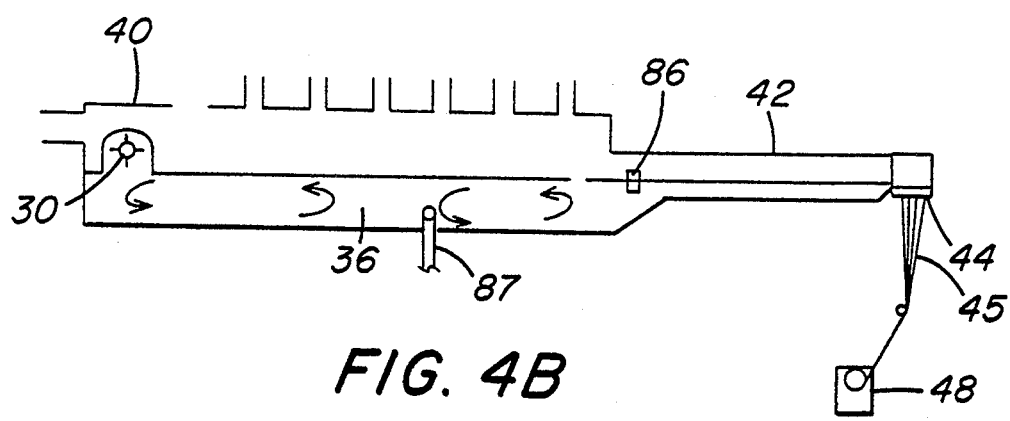

The side view of FIG. 4b shows how the arrangement of burners 38 can be operated alone or in conjunction with one or more bubblers 87 to set up convection currents in the melt pool 36 in the melting of the Scrap 14. The bubblers can be those that are well known in the art for use in melting in standard arrangements and with a standard flow rate of air or other gas. Mixing by the convection currents can provide a near homogeneous melt that eventually flows under skimmer block 86 through forehearth 42 and into and through bushing position 44 to produce glass fiber product 45. Fibers 45 can be and preferably are pulled from bushing 44 by a wet-chop pull wheel as in FIG. 1 or winder 48 as shown in FIG. 4b. Also depicted in FIG. 4B at the top or melter 40 is a plurality of exhaust ducts, not numbered.

Figure 5:
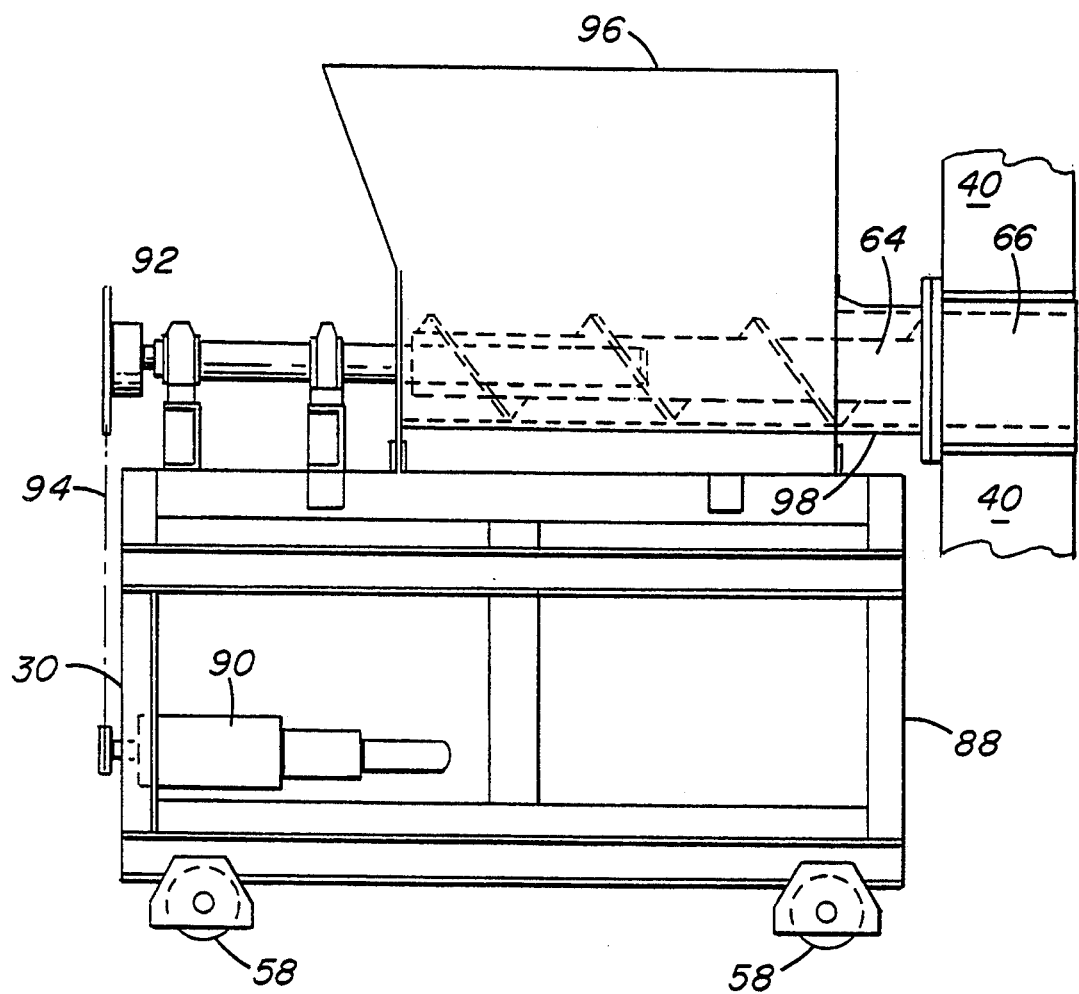
FIG. 5 is a side view with a cut-away showing the auger of the positive feeding means of the material supply apparatus.

FIG. 5 shows a side view of feeder 30 with a cutaway at the portion of feeder 30 having auger 64. Also shown is the dead space 66 in front of auger 64. Also shown are moving means 68 for the supply means 30. The supply means 30 has housing 88 to support the drive motor 90 that drives auger 64. Any suitable drive known to those skilled in the art can be used to drive the auger 64, and preferably the motor is variable speed; for example, like Link Belt PIV. For the variable drive clutch 92 is in drive linkage with motor drive 90 through belt 94. Also shown is hopper 62 in material supply engagement with auger 64. Also, hopper 62 has lid 96. The positive and dynamic design of the auger is from its flights that preferably have a distance between one peak and another peak on the same longitudinal axis of up to around the largest dimension of length of the shredded Scrap 14. Most preferably, the distance is from around 15 to around 17 inches (380 to 432 mm.). Preferably, the auger 64 can clear the inner diameter of the auger housing 98 by around 1 inch (25 mm.) between the tops of the flights and the auger housing 98. In other words, the outer diameter of the auger 64 to the extremes of the flights of the auger 64 is around 2 inches (51 mm.) less than the inner diameter of the auger housing 98. Dead space 66 generally has a dimension to provide for plug-flow movement of the scrap leaving auger 64 for movement into melter 40. The plug of the Scrap assists in insulating the metal auger from the heat of melter 40, and this reduces the possibility of scrap glass softening and melting upon initially contacting the auger 64. Preferably, dead space 66 has a dimension ranging from around 6 to around 18 inches (152 to 458 mm.) for an auger 64 having a diameter of around 8 to around 12 inches (203 to 305 mm.).

The preferred moisture content of the scrap entering the melter 40 ranges from around 1 to 3 weight percent and the preferred amount of excess oxygen for the hydrocarbon fuel burners is from around 1 to 3 percent as measured in the exhaust air from the melter 40. Preferably, a level controller, not shown in figures, is present in hopper 62 to assure the supply of Scrap 14 to hopper 16 by sensing the level and signal conveyor 20 to deliver more or in some instances less Scrap 14. The level controller for hopper 62 can be any level controller known to those skilled in the art.

After the melter is charged with the initial charge of glass melt, it is preferred that 100 percent of the glass forming material needed for melter 40 is supplied from the scrap. Although no particulate or batch glass forming materials are added, a small amount of glass modifying materials can be added along with the scrap. For instance, sulfates can be added to assist in refining and adjusting the glass redox ratio. When less than 100 percent of the scrap is used to supply glass forming material, the remainder is supplied as cullet or frit.

Generally, the melter is operated at a temperature sufficient to produce the glass melt and to oxidize completely all of the organic compounds contained in the Scrap glass 14.

We claim:

1. Process for producing glass fiber product from scrap glass fibers, comprising:

feeding to a glass melter scrap glass fibers having an average length of less than around 12 inches (305 mm.) and having an approximately similar fiberizable inorganic composition to that of the glass fiber product, where at least some of the fibers have coatings with organic compounds, where the feeding rate is sufficient to maintain a pool of melted glass in the melter with any changes in the level of the pool maintained to less than around 0.35 inch (9 mm.) over a period of eight hours;

melting the scrap glass fibers in the presence of an oxidizing atmosphere in at least the vicinity of the feed of the scrap glass fibers and at a temperature at least sufficient to melt the fibers in the presence of an oxidizing atmosphere and in the presence of the pool of melted glass and without the presence of non-vitrified glass forming materials being feed to the melter to maintain the level of the pool when melted glass is pulled from the melter in the production of glass fiber product;

conditioning the glass melt at a temperature less than the temperatures of the melter to a forming viscosity; and forming glass fiber product from at least one bushing adapted to receive the conditioned glass melt, with a near constant pull of melted glass from the melter for a given glass fiber product.

2. Process of claim 1, which includes preparing the scrap glass fibers into lengths where the average length is up to around 12 inches with most lengths less than around 100 inches.

3. Process of claim 2 wherein preparing the lengths of scrap glass fibers is by shredding.

4. Process of claim 1 wherein the feeding of the scrap glass is accompanied by the feeding of glass forming material with a prior melt history selected from the group consisting of frit, cullet, and marbles.

5. Process of claim 4 wherein the feeding of the scrap glass and the feeding of the other glass forming material is through separate entry ports in the melter.

6. Process of claim 1 which includes preparing the pool of molten glass in the melter from fiberizable glass forming material selected from the group of: batch constituents of fiberizable glass composition within ±10 percent of the amounts of each material in the glass composition of the scrap glass fibers fed to the melter, and glass forming materials with a prior melt history including marbles, cullet, frit, beads and mixtures of these and mixtures of batch constituents glass formers and glass formers with a prior melt history, wherein when the pool is formed the rate of addition of the glass forming materials is at a sufficient rate to form a pool of effective depth for fiber formation.

7. Process of claim 1 wherein the feeding of the scrap glass is to a melter that is refractory-lined with its horizontal length greater than its width where a majority of the homogenization of the melt is accomplished without mechanical stirrers.

8. Process of claim 1 which includes forming cullet from at least one other additional bushing position in addition to the forming of a plurality of fibers from at least one bushing position to produce the glass fiber product.

9. Process of claim 8 wherein the forming of cullet is by fluid quenching of the one or more molten streams of glass issuing from the other bushing.

10. Process of claim 1 wherein the feeding of the scrap glass fibers is by a screw auger into the entry port of the melter wherein the auger has flights spaced apart along the longitudinal axis of the auger a distance similar to the average length of the scrap glass fibers and where the auger is encased within a housing to provide a clearance between the tops of the flights and the inside of the housing of around 0.5 inch to 2 inches.

11. Process of claim 10 wherein the feeding of the scrap glass fibers is by a screw auger having a last flight proximate to the melter spaced apart from the interior of the melter to form a longitudinal dead space ranging from around 1 to 12 inches along the longitudinal axis in front of the flights of the auger and before the interior of the melter.

12. Process of claim 1 which includes metering the scrap glass fibers before feeding to the melter so that a more uniform supply of fibers is provided to the melter.

13. Process of claim 1, which includes checking the scrap glass fibers before feeding to the melter for contaminants and removing any detected contaminants.

14. Process of claim 1, which includes drying the scrap glass fibers before feeding to the melter.

15. Process of claim 1 wherein the feeding of scrap glass fibers includes those with the coatings with organic compounds including sized glass fibers and coated glass fibers wherein the sized fibers can have an amount of an organic-containing, moisture-reduced residue from an aqueous chemical treating composition ranging from around 0.1 up to around 20 weight percent of the treated glass fibers.

16. Process of claim 1, which includes providing the oxidizing atmosphere to the melter by including a stoichiometric excess amount of oxygen for combustion of the fuel provided to one or more of the burners of the melter to obtain the melting temperature for the glass.

17. Process for feeding 100 percent scrap fiber glass to a glass melter to produce glass fiber strand product, comprising:
   shredding scrap sized or coated glass fibers to all average length in the range of around 0.5 to around 10 inches;
   feeding the shredded scrap glass fibers of approximately similar fiberizable inorganic composition to the glass fiber product in the absence of any glass forming batch materials and as the only glass forming feed material onto a bath of molten glass in a melter, where the feeding rate is sufficient to maintain a bath of melted glass in the melter with any changes in the level of the bath maintained to less than around 0.25 inch (6.2 mm.) over a period of eight hours;
   melting the scrap glass fibers into the bath at a temperature at least sufficient to melt the fibers in the presence of an oxidizing atmosphere where the amount of excess oxygen over that stoichiometrically required for the combustion of fuel by the burners of the melter is in the range of up to 3 percent, wherein the bath is formed from the melting of glass forming materials of fiberizable inorganic compositions similar to that of the glass fiber product selected from the group consisting of: glass fibers, cullet, frit, marbles and beads with a prior melt history and mixtures of these, and batch constituents of fiberizable glass matching within ±10 percent of the amounts of the materials in the shredded glass fibers fed to the melter and mixtures of the glass formers with a prior melt history and batch;
   cooling the glass melt to a forming viscosity; and
   forming glass fiber product from at least one bushing adapted to receive the glass melt with the forming viscosity with a near constant pull of melted glass from the melter for a given glass fiber product.

18. Process for the producing glass fiber strand products from scrap glass fiber strand, comprising:
   a) feeding shredded, scrap, chemically treated, glass fibers selected from sized and coated glass fibers having i) average lengths up to around 12 inches, ii) a moisture content of less than around 10 weight percent of the feed, and iii) silicate composition similar to that of the glass fiber strand product and essentially free of powdered glass forming materials, to a refractory-lined, glass melter having a high length to width ratio and having a pool of melted glass where the feeding rate is sufficient to maintain a pool of melted glass in the melter with any changes in the level of the pool maintained to less than around 0.25 inch (6.2 mm.) over a period of eight hours;
   b) melting the scrap glass fibers in the melter without the presence of powdered glass forming materials in an oxidizing atmosphere from the presence of excess oxygen from around 1 to around 3 percent of the stoichiometric amount needed for combustion of the fuel to the hydrocarbon fuel burners of the melter that are arranged along the side walls of the melter, wherein the pool of melted glass in the melter upon the initial addition of the scrap glass is formed from fiberizable inorganic glass forming material with compositions similar to that of the glass fiber product selected from the group of: scrap glass fibers, cullet, frit, marbles and beads with a prior melt history and mixtures of these, and batch constituents of fiberizable glass matching within ±10 percent of the amounts of the materials in the shredded glass fibers feed to the melter and mixtures of the glass formers with a prior melt history and batch, and wherein the temperature profile of the melter within a temperature range of around 1400° C. to around 1600° C. crown temperature assists in providing natural convection currents to remove inhomogeneities in the glass melt without any major forced convection supplied by mechanical stirrers;
   c) conditioning the melted glass in a refractory-lined forehearth connected to the melter at an effective temperature;
   d) forming glass fibers from at least one bushing position that has a plurality of tips to issue molten streams of glass and that is associated with the forehearth with a nearly constant pull rate of molten glass from the melter for a given glass fiber product.

* * * * *